(12) United States Patent
Sundberg et al.

(10) Patent No.: US 11,089,550 B2
(45) Date of Patent: Aug. 10, 2021

(54) CONFIGURATION RESTRICTION FOR RADIO FREQUENCY OPERATION FOR SHORTENED TRANSMISSION TIME INTERVAL PATTERNS

(71) Applicant: Telefonaktiebolaget LM Ericsson (publ), Stockholm (SE)

(72) Inventors: Mårten Sundberg, Årsta (SE); Daniel Chen Larsson, Lund (SE); Laetitia Falconetti, Järfälla (SE); Muhammad Kazmi, Sundbyberg (SE); Imadur Rahman, Sollentuna (SE)

(73) Assignee: Telefonaktiebolaget LM Ericsson (Publ)

( * ) Notice: Subject to any disclaimer, the term of this patent is extended or adjusted under 35 U.S.C. 154(b) by 203 days.

(21) Appl. No.: 16/344,063

(22) PCT Filed: Nov. 3, 2017

(86) PCT No.: PCT/SE2017/051094
§ 371 (c)(1),
(2) Date: Apr. 23, 2019

(87) PCT Pub. No.: WO2018/084793
PCT Pub. Date: May 11, 2018

(65) Prior Publication Data
US 2019/0373551 A1   Dec. 5, 2019

Related U.S. Application Data

(60) Provisional application No. 62/417,625, filed on Nov. 4, 2016.

(51) Int. Cl.
*H04W 52/02* (2009.01)
*H04L 5/00* (2006.01)

(52) U.S. Cl.
CPC ....... *H04W 52/0245* (2013.01); *H04L 5/0044* (2013.01); *H04L 5/0064* (2013.01);
(Continued)

(58) Field of Classification Search
USPC ......................................... 370/311
See application file for complete search history.

(56) References Cited

U.S. PATENT DOCUMENTS

2012/0294254 A1   11/2012   Behravan et al.
2014/0112260 A1    4/2014   Sorrentino
(Continued)

FOREIGN PATENT DOCUMENTS

WO   2016040290 A1   3/2016

OTHER PUBLICATIONS

International Search Report and Written Opinion dated Apr. 16, 2018 for International Application No. PCT/SE2017/051094 filed on Nov. 3, 2017, consisting of 23-pages.
(Continued)

*Primary Examiner* — Angel T Brockman
(74) *Attorney, Agent, or Firm* — Christopher & Weisberg, P.A.

(57) ABSTRACT

According to one aspect, a method includes selecting at least one of a common bandwidth scheme and a common power scheme. If the selected at least one scheme includes a common bandwidth scheme, a common bandwidth to be used by the wireless device for transmission of two data channels in two successive short transmission time intervals, sTTIs, that share a common demodulation reference signal, DMRS, is determined. An indication of the common bandwidth to the wireless device to enable the wireless device to set the bandwidth of the two data channels to a common bandwidth value is sent. If the selected at least one scheme includes a common power scheme, then a common power
(Continued)

control command to control an output power to be set by the wireless device for two data channels in two successive sTTI, that share a common DMRS is determined.

21 Claims, 10 Drawing Sheets

(52) U.S. Cl.
CPC .......... *H04L 5/0089* (2013.01); *H04L 5/0092* (2013.01); *H04W 52/0216* (2013.01)

(56) References Cited

U.S. PATENT DOCUMENTS

| | | | |
|---|---|---|---|
| 2016/0095137 | A1 | 3/2016 | Chen et al. |
| 2016/0204921 | A1* | 7/2016 | Kim ...................... H04L 12/189 370/312 |
| 2016/0323901 | A1 | 11/2016 | Yum et al. |
| 2017/0338988 | A1* | 11/2017 | Yin ...................... H04L 5/0082 |

OTHER PUBLICATIONS

3GPP TS 36.213 V14.11.0; 3rd Generation Partnership Project; Technical Specification Group Radio Access Network; Evolved Universal Terrestrial Radio Access (E-UTRA); Physical layer procedures (Release 14); Jun. 2016, consisting of 471-pages.
3GPP TSG RAN Meeting #72 RP-161299; Title: New Work Item on shortened TTI and processing time for LTE; Source: Ericsson; Document for: Approval; Agenda Item: 10.1.1; Location and Date: Busan, Korea, Jun. 13-16, 2016, consisting of 9-pages.
3GPP TSG RAN WG1 Meeting #86bis R1-1609216; Title: sPUCCH for HARQ-ACK in shortened TTI; Agenda Item: 7.2.10.2.1; Source: LG Electronics; Document for: Discussion, Location and Date: Lisbon, Portugal, Oct. 10-14, 2016, consisting of 7-pages.
3GPP TSG RAN WG1 Meeting #86bis R1-1610048; Title: sPUSCH for shortened TTI; Agenda Item: 7.2.10.2.1; Source: NTT DOCOMO, Inc.; Document for: Discussion and Decision, Location and Date: Lisbon, Portugal, Oct. 10-14, 2016, consisting of 8-pages.
3GPP TSG RAN WG1 Meeting #76 R1-140296; Title: Remaining Details of Power Control enhancements for TDD eIMTA; Agenda Item: 7.2.1.1; Source: LG Electronics; Document for: Discussion and Decision, Location and Date: Prague, Czech Republic, Feb. 10-14, 2014, consisting of 6-pages.
3GPP TSG RAN WG1 Meeting #47 R1-063085; Title: Uplink Reference Signal for E-UTRA; Agenda Item: 6.4.2.; Source: Huawei; Document for: Discussion and Decision, Location and Date: Riga, Lativa, Nov. 6-10, 2006, consisting of 5-pages.
3GPP TSG RAN WG1 Meeting #46 bis R1-062641; Title: Multiplexing of Distributed ("Sounding") Reference Signals for CQI Measurement and Scheduling in EUTRA Uplink; Agenda Item: 6.5.2; Source: Texas Instruments; Document for: Discussion—Decision, Location and Date: Seoul, Korea, Oct. 9-13, 2006, consisting of 12-pages.
Communication dated Feb. 24, 2021 for Application No. 17804973. 0, consisting of 9-pages.
3GPP TSG RAN WG1 Meeting #86bis R1-1608641; Title: Discussion on UL RS for short TTI; Agenda Item: 7.2.10.2.1; Source: Huawei, HiSilicon; Document for: Discussion and decision; Date and Location: Oct. 10-14, 2016, Lisbon, Portugal, consisting of 3-pages.
TSG-RAN Working Group 4 (Radio) Meeting #76bis R4-155900; Title: Pcmax misalignment between 36.101 and 36.213 for DC; Agenda Item: 5.1.3; Source: Ericsson; Document for: Approval; Date and Location: Oct. 12-16, 2015, Sophia Antipolis, France, consisting of 6-pages.
Indian Office Action dated Mar. 23, 2021 for Application No. 201917014441, consisting of 7-pages.
3GPP TSG RAN WG1 Meeting #86bis R1-1609216; Title: sPUCCH for HARQ-ACK in shortened TTI; Agenda Item: 7.2.10.2.1; Source: LG Electronics; Document for: Discussion; Date and Location: Oct. 10-14, 2016, Lisbon, Portugal, consisting of 7-pages.

\* cited by examiner

CONFIGURATION RESTRICTION FOR RADIO FREQUENCY OPERATION FOR SHORTENED TRANSMISSION TIME INTERVAL PATTERNS

CROSS-REFERENCE TO RELATED APPLICATIONS

This application is a Submission Under 35 U.S.C. § 371 for U.S. National Stage Patent Application of International Application No.: PCT/SE2017/051094, filed Nov. 3, 2017 entitled "CONFIGURATION RESTRICTION FOR RADIO FREQUENCY OPERATION FOR SHORTENED TRANSMISSION TIME INTERVAL PATTERNS," which claims priority to U.S. Provisional Application No. 62/417,625, filed Nov. 4, 2016, entitled "CONFIGURATION RESTRICTIONS TO ENSURE PROPER RF OPERATION FOR SHORTENED TTI PATTERNS," the entireties of both of which are incorporated herein by reference.

TECHNICAL FIELD

This disclosure relates to wireless communications, and in particular, configuration restrictions to ensure proper radio frequency (RF) operation for shortened transmission time interval (TTI) patterns.

BACKGROUND

Packet data latency is one of the performance metrics that vendors, operators and also end-users (via speed test applications) regularly measure. Latency measurements are done in all phases of a radio access network system lifetime, such as when verifying a new software release or system component, when deploying a system and when the system is in commercial operation.

Shorter latency than previous generations of third generation partnership project (3GPP) radio access technologies (RATs) was one performance metric that guided the design of Long Term Evolution (LTE). LTE is also now recognized by the end-users to be a system that provides faster access to the Internet and lower data latencies than previous generations of mobile radio technologies.

Packet data latency is important not only for the perceived responsiveness of the system; it is also a parameter that indirectly influences the throughput of the system. Hypertext transfer protocol/transmission control protocol (HTTP/TCP) is the dominating application and transport layer protocol suite used on the Internet today. According to HTTP Archive (http://httparchive.org/trends.php) the typical size of HTTP based transactions over the Internet are in the range of a few tens of Kilobytes up to 1 Megabyte. In this size range, the TCP slow start period is a significant part of the total transport period of the packet stream. During TCP slow start the performance is latency limited. Hence, improved latency can rather easily be shown to improve the average throughput, for this type of TCP based data transaction.

Radio resource efficiency could be positively impacted by latency reductions. Lower packet data latency could increase the number of transmissions possible within a certain delay bound; hence higher Block Error Rate (BLER) targets could be used for the data transmissions freeing up radio resources and potentially improving the capacity of the system.

Long term evolution (LTE) uses orthogonal frequency division multiplex (OFDM) in the downlink and discrete Fourier transform (DFT)-spread OFDM in the uplink. In the time domain, LTE downlink transmissions are organized into radio frames of 10 ms, each radio frame consisting often equally-sized subframes of length Tsubframe=1 ms, as shown in FIG. 1.

Furthermore, the resource allocation in LTE is typically described in terms of resource blocks (RB), where a resource block corresponds to one slot (0.5 ms) in the time domain and 12 contiguous subcarriers in the frequency domain. A pair of two adjacent resource blocks in time direction (1.0 ms) is known as a resource block pair. This is also denoted as a TTI (Transmission Time Interval).

Downlink transmissions are dynamically scheduled, i.e., in each subframe the base station transmits control information indicating to which terminals data is transmitted and upon which resource blocks the data is transmitted, in the current downlink subframe. This control signaling is typically transmitted in the first 1, 2, 3 or 4 OFDM symbols in each subframe and the number n=1, 2, 3 or 4 is known as the Control Format Indicator (CFI) indicated by the physical CFI channel (PCFICH) transmitted in the first symbol of the control region. The control region also contains physical downlink control channels (PDCCH) and possibly also physical hybrid automated repeat request (HARQ) indication channels (PHICH) carrying acknowledge/non-acknowledge (ACK/NACK) for the uplink transmission.

The downlink subframe also contains common reference symbols (CRS), which are known to the receiver and used for coherent demodulation of, e.g., the control information. A downlink system with CFI=3 OFDM symbols as control is illustrated in FIG. 2. In a Rel-8 TTI, one such portion of the DL transmission is termed as one TTI.

One area to address when it comes to packet latency reductions is the reduction of transport time of data and control signaling, by addressing the length of a transmission time interval (TTI). In LTE release 8, a TTI corresponds to one subframe (SF) of length 1 millisecond. One such 1 ms TTI is constructed by using 14 OFDM or single carrier-frequency division multiple access (SC-FDMA) symbols in the case of normal cyclic prefix and 12 OFDM or SC-FDMA symbols in the case of extended cyclic prefix. Currently, in LTE transmissions with shorter TTIs that are much shorter than the LTE release 8 TTI are being defined.

It should be noted that the reference to TTI is to the Transmission Time Interval over the physical layer, i.e., when transmitting over the air interface. This is not fully aligned with the definition in the specifications of TTI. Furthermore, it can be noted that the terminology to use for a shorter transmission time over the air interface is being discussed in 3GPP, and the use of the terminology "shortened TTI" is likely to be changed. An example terminology that is being discussed is partial subframe (PSF).

The shorter TTIs can be decided to have any duration in time and comprise resources on a number of OFDM or SC-FDMA symbols within a 1 ms subframe (SF). As one example, the duration of the short TTI (sTTI) may be 0.5 ms, i.e., seven OFDM or SC-FDMA symbols for the case with normal cyclic prefix. As another example, the duration of the short TTI may be 2 symbols. In another example, the duration of the short TTI may be 4 symbols. The TTI can be the same in the UL and DL of the same cell. The TTI can also be different in UL and DL in the same cell, e.g., 0.5 ms in DL and 1 ms in UL. The TTI can also be different in different serving cells of the, e.g., TTI of 2 symbols in a primary cell (PCell) and TTI of 1 ms in a secondary cell (SCell).

The shortened TTI can be used in different values in different direction, such as DL and UL. For example: a DL can use 2-OFDM symbols (OS) sTTI, while the UL can use 4-OS sTTI in the same cell.

For different frame structures, such as FS1, FS2 and FS3, the sTTI that is used could be different too. The time domain structure in FIG. 1 relates to FS1. All three of 2-OS, 4OS and 7 OS TTI are usable for FS1. For FS2 which is used for TDD, 7-OS sTTI is one of the shortened TTI mode.

Power Control for UL data channel with 1 ms TTI (PUSCH) and short TTI (sPUSCH):
Power control for the physical uplink shared channel PUSCH is defined in 3GPP TS36.213 as, for subframe i and serving cell c, $$P_{PUSCH,c}(i) = \min \begin{cases} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \alpha_c(j) \cdot PL_c + \\ \Delta_{TF,c}(i) + f_c(i) \end{cases}$$

where, $\hat{P}_{CMAXc}(i)$ is the maximum transmit power in linear scale.
$\hat{P}_{PUCCH}(i)$ is the power of simultaneously transmitted PUCCH in linear scale, is equal to zero if no PUCCH is transmitted.
$M_{PUSCH,c}(i)$ is the number of resource blocks.
$P_{O\_PUSCH,c}(j)$ is the target of received power signaled to the over RRC.
$\alpha_c(j) \cdot PL_c$ is the scaled downlink path loss estimate, with $0 \leq \alpha_c(j) \leq 1$ signaled to the wireless device over RRC.
$\Delta_{TF,c}(i)$ is an adjustment factor depending on number of coded bits that is exactly specified in 3GPP TS36.213.
$f_c(i)$ is the closed loop power control derived from what $\delta_{PUSCH}$ which is signaled to the wireless device in the UL grant.
Two methods exist today in LTE to calculate $f_c$, either accumulation-based or not. If the accumulation-based calculation is not activated, $f_c(i)$ follows directly the value of $\delta_{PUSCH}$ indicated in the UL grant. If accumulation-based calculation is activated, $f_c(i)$ is updated according to $\delta_{PUSCH}$ in the UL grant and its previous value $f_c(i-1)$ according to $f_c(i)=f_c(i-1)+\delta_{PUSCH,c}(i-K_{PUSCH})$. $K_{PUSCH}$ represents the delay between the UL grant and the UL data transmission (Tx).

As seen in the above equation, the total power for the PUSCH can vary from TTI to TTI because of different resource block allocation. As long as the parameters in the above equation are the same in different TTIs and the maximum output power of a wireless device is not exceeded, the power per allocated resource block is the same in different TTIs even if the resource allocation is different in different TTI. If a resource allocation in a given TTI requires more power than allowed by the maximum output power, the power per allocated resource block is scaled so as not to exceed the maximum output power. The power control for short TTI PUSCH (sPUSCH) has not yet been defined.

One problem with reducing the transmission time is that more overhead is required, specifically in the UL, where each packet sent needs to be associated with a reference symbol in order for the base station, e.g., eNB, to perform channel estimation and demodulation of the data symbols sent. If for example the block consists of 2 symbols, at least one symbol needs to be used for reference symbol purposes (if assuming the reference symbol and data symbol when transmitted both take up the full allocation in the frequency domain). This implies that there will be at least a 50% overhead in the payload transmission (disregarding any other overhead from cyclic prefix, guard periods, protocol overheads, etc.). This could be prohibitive from an actual system throughput performance point of view.

SUMMARY

Some embodiments advantageously provide methods, network nodes and wireless devices configured for scheduling and resource allocation to a wireless device. According to one aspect, a method in a network node for resource allocation for transmissions of a wireless device is provided. The method includes selecting at least one of a common bandwidth scheme and a common power scheme. If the selected at least one scheme includes a common bandwidth scheme, then the method includes determining a common bandwidth to be used by the wireless device for transmission of two channels in two successive transmission time intervals (TTI) that share a common reference signal (RS); and sending an indication of the common bandwidth to the wireless device to enable the wireless device to set the bandwidth of the two channels to a common bandwidth value. If the selected at least one scheme includes a common power scheme, then the method includes determining a common power control command to control an output power to be set by the wireless device for two channels in two successive TTIs, that share a common RS; and sending the common power control command to the wireless device to enable the wireless device to set the output power of the two channels to a common power value.

According to the aspect, in some embodiments, the data channels transmitted in two successive TTIs are physical uplink shared channels, PUSCH. In some embodiments, the common bandwidth is greater than a bandwidth of one of the two channels having a greatest bandwidth. In some embodiments, the common bandwidth encompasses a combined bandwidth of the two successive TTIs. In some embodiments, the common bandwidth is selected to ensure a same power per allocated resource block. In some embodiments, the indication of the common bandwidth includes a bandwidth of the RS that encompasses the bandwidth of the two successive TTIs. In some embodiments, the common power control command instructs the wireless device to set the output power of the two channels to a highest power of a plurality of power levels. In some embodiments, the common power control command is based on at least one of a signal level of a received uplink signal and a mapping between the common power control command to a change in phase of a received uplink signal. In some embodiments, the common power control command is based on a function of a power level available at the wireless device, the function being one of a maximum, a minimum and an average. In some embodiments, the common power control command is autonomously determined by the network node based on one of a pre-defined rule, statistics and historical data. In some embodiments, the common power value is a wireless device-selected power of a selected one of the two successive TTIs. In some embodiments, the common power control command establishes a maximum power and instructs the wireless device not to exceed the maximum power when establishing the common power value. In some embodiments, the network node schedules non-successive data channels for a wireless device.

According to another aspect, a network node for resource allocation for transmissions of a wireless device is provided. The network node includes processing circuitry configured to select at least one of a common bandwidth scheme and a common power scheme. If the selected at least one scheme includes a common bandwidth scheme, then: the processing circuitry is configured to determine a common bandwidth to be used by the wireless device for transmission of two channels in two successive TTIs that share a common RS; and further to send an indication of the common bandwidth to the wireless device to enable the wireless device to set the bandwidth of the two channels to a common bandwidth value. If the selected at least one scheme includes a common power scheme, then the processing circuitry is configured to determine a common power control command to control an output power to be set by the wireless device for two channels in two successive TTIs that share a common RS; and send the common power control command to the wireless device to enable the wireless device to set the output power of the two channels to a common power value.

According to this aspect, in some embodiments, the two channels transmitted in two successive TTIs are physical uplink shared channels (PUSCH). In some embodiments, the common bandwidth is greater than a bandwidth of one of the two channels having a greatest bandwidth. In some embodiments, the common bandwidth encompasses a combined bandwidth of the two successive TTIs. In some embodiments, the common bandwidth is selected to ensure a same power per allocated resource block. In some embodiments, the indication of the common bandwidth includes a bandwidth of the RS that encompasses the bandwidth of the two successive TTIs. In some embodiments, the common power control command instructs the wireless device to set the output power of the two channels to a highest power of a plurality of power levels. In some embodiments, the common power control command is based on at least one of a signal level of a received uplink signal and a mapping between the common power control command to a change in phase of a received uplink signal. In some embodiments, the common power control command is based on a function of a power level available at the wireless device, the function being one of a maximum, a minimum and an average. In some embodiments, the common power control command is autonomously determined by the network node based on one of a pre-defined rule, statistics and historical data. In some embodiments, the common power value is a wireless device-selected power of a selected one of the two successive TTIs. In some embodiments, the common power control command establishes a maximum power and instructs the wireless device not to exceed the maximum power when establishing the common power value. In some embodiments, the network node schedules non-successive data channels for a wireless device.

According to yet another aspect, a network node for resource allocation for transmissions of a wireless device. The network node includes a selection module configured to select at least one of a common bandwidth scheme and a common power scheme. The network node includes a bandwidth indication module configured to determine a common bandwidth to be used by the wireless device for transmission of two channels in two successive TTIs that share a common RS. The network node further includes a transceiver module configured to send an indication of the common bandwidth to the wireless device to enable the wireless device to set the bandwidth of the two channels to a common bandwidth value. The network node includes a power control module configured to determine a common power control command to control an output power to be set by the wireless device for two channels in two successive TTIs that share a common RS. The transceiver module is further configured to send the common power control command to the wireless device to enable the wireless device to set the output power of the two channels to a common power value.

According to yet another aspect, a method in a wireless device for resource allocation for uplink transmissions is provided. The method includes receiving at least one of a bandwidth indication and a common power control command. If a bandwidth indication is received, then the method includes determining a common bandwidth based on the bandwidth indication to be used by the wireless device for transmission of two channels in two successive TTI that share a common RS. If a common power control command is received, then the method includes controlling an output power based on the common power control command to be set by the wireless device for two channels in two successive sTTIs that share a common DMRS.

According to this aspect, in some embodiments, the two channels are PUSCH. In some embodiments, the common bandwidth is greater than a bandwidth of one of the two channels having a greatest bandwidth. In some embodiments, the common bandwidth encompasses a combined bandwidth of the two successive TTIs. In some embodiments, the common bandwidth is selected to ensure a same power per allocated resource block. In some embodiments, the bandwidth indication indicates a bandwidth of the RS that encompasses the bandwidth of the two successive TTIs. In some embodiments, the common power control command instructs the wireless device to set the output power of the two channels to a highest power of a plurality of power levels. In some embodiments, the common power control command establishes a maximum power and instructs the wireless device not to exceed the maximum power when establishing the common power value.

According to another aspect, a wireless device for resource allocation for uplink transmissions is provided. The wireless device includes a transceiver configured to receive at least one of a bandwidth indication and a common power control command. The wireless device further includes processing circuitry configured to determine a common bandwidth based on the bandwidth indication to be used by the wireless device for transmission of two channels on two successive TTI that share a common RS. The processing circuitry is further configured to control an output power based on the common power control command to be set by the wireless device for at least two channels on two successive TTIs that share a common RS.

According to this aspect, in some embodiments, two channels are PUSCH. In some embodiments, the common bandwidth is greater than a bandwidth of one of the two channels having a greatest bandwidth. In some embodiments, the common bandwidth encompasses a combined bandwidth of the two successive TTIs. In some embodiments, the common bandwidth is selected to ensure a same power per allocated resource block. In some embodiments, the bandwidth indication indicates a bandwidth of the RS that encompasses the bandwidth of the two successive TTIs. In some embodiments, the common power control command instructs the wireless device to set the output power of the two channels to a highest power of a plurality of power levels. In some embodiments, the common power control command establishes a maximum power and instructs the wireless device not to exceed the maximum power when establishing the common power value.

According to yet another aspect, a wireless device for resource allocation for uplink transmissions is provided. The wireless device includes a transceiver module configured to receive at least one of a bandwidth indication and a common power control command. The wireless device also includes a bandwidth control module configured to determine a common bandwidth based on the bandwidth indication to be used by the wireless device for transmission of two channels on two successive TTIs that share a common RS. The wireless device also includes a power control module configured to control an output power based on the common power control command to be set by the wireless device for two channels on two successive TTIs that share a common RS.

According to another aspect, a method in a wireless device for uplink transmissions of signals is provided. The method includes determining that the wireless device 16 shall transmit two channels in two successive transmission time intervals, TTIs, that share a common reference signal, R. The method also includes transmitting the two channels in the two successive transmission time intervals, TTIs that share the common RS with the same output power.

According to this aspect, in some embodiments, the TTI is any of: a short TTI, sTTI, slot, and a mini-slot. In some embodiments, the RS is any of a demodulation reference signal (DMRS) and a sounding reference signal, SRS.

According to yet another aspect, a wireless device for uplink transmissions of signals is provided. The wireless device includes processing circuitry configured to determine that the wireless device shall transmit two channels in two successive transmission time intervals (TTIs), that share a common reference signal (RS) and a transceiver configured to transmit the two channels in the two successive transmission time intervals, TTIs that share the common RS with the same output power.

According to this aspect, in some embodiments, the TTI is any of: a short TTI, sTTI, slot, and a mini-slot. In some embodiments, the RS is any of a demodulation reference signal, DMRS, and a sounding reference signal, SRS.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
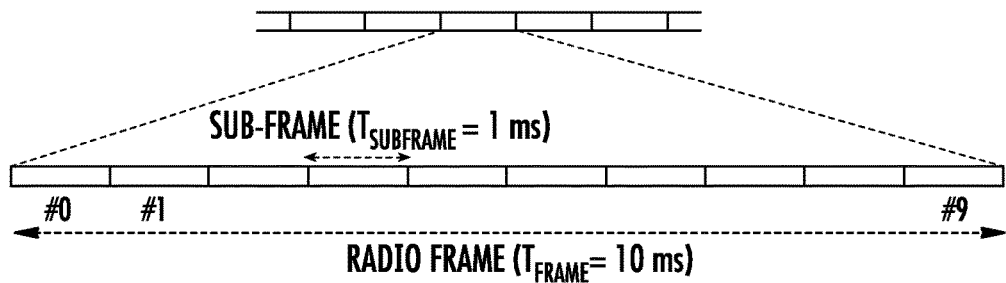
FIG. 1 is a timing structure of a radio frame.
Figure 2:
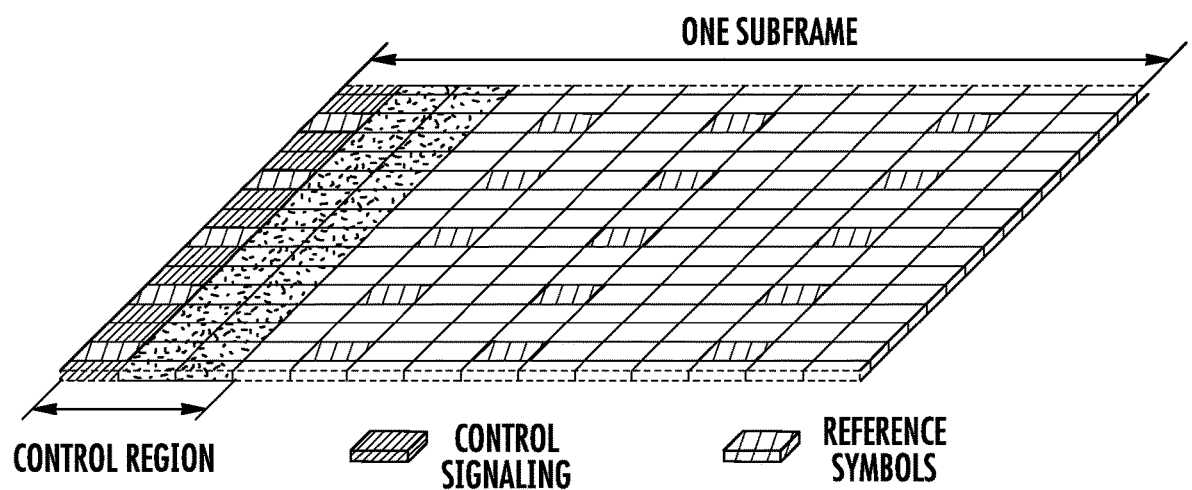
FIG. 2 is a resource grid.

Before describing in detail exemplary embodiments, it is noted that the embodiments reside primarily in combinations of apparatus components and processing steps related to configuration restrictions to ensure proper radio frequency (RF) operation for shortened transmission time interval (TTI) patterns. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Although embodiments are described herein with reference to certain functions being performed by network node 14, it is understood that the functions can be performed in other network nodes and elements. It is also understood that the functions of the network node 14 can be distributed across network cloud 12 so that other nodes can perform one or more functions or even parts of functions described herein.

As used herein, a first node and a second node are two network nodes which are either transmitting or receiving in an unlicensed spectrum (or a shared spectrum where more than one system operates based on some kind of sharing regulations). An example of a first node is a network node, which could be any type of radio network node or any network node, which communicates with a wireless device and/or with another network node. Examples of network nodes are NodeB, base station (BS), multi-standard radio (MSR) radio node such as MSR BS, eNodeB, gNodeB, MeNB, SeNB, network controller, radio network controller (RNC), base station controller (BSC), relay, donor node controlling relay, base transceiver station (BTS), access point (AP), transmission points, transmission nodes, Remote Radio Unit (RRU), Remote Radio Head (RRH), nodes in distributed antenna system (DAS), core network node (e.g., MSC, MME, etc.), O&M, OSS, SON, positioning node (e.g., E-SMLC), MDT, etc.

Another example of a node could be a wireless device (WD). The term wireless device refers to any type of wireless device communicating with a network node and/or with another wireless device in a cellular or mobile communication system. Examples of wireless devices are target device, device to device (D2D) wireless device, machine type wireless device or wireless device capable of machine to machine (M2M) communication, PDA, Tablet, mobile terminals, smart phone, laptop embedded equipped (LEE), laptop mounted equipment (LME), USB dongles etc.

In some embodiments generic terminology, "radio network node" or simply "network node (NW node)", is used. A network node or radio network node can be any kind of network node which may comprise of base station, radio base station, base transceiver station, base station controller, network controller, evolved Node B (eNB), Node B, relay node, access point, radio access point, Remote Radio Unit (RRU), Remote Radio Head (RRH), etc.

The term signal used herein can be any physical signal or physical channel. Examples of physical signals are reference signal such as PSS, SSS, CRS, SRS, DMRS, PRS, etc. The term physical channel (e.g., in the context of channel reception) used herein is also called as channel, data channel, control channel. Examples of physical channels are management information base (MIB), physical broadcast channel (PBCH), narrowband PBCH (NPBCH), physical downlink control channel (PDCCH), physical downlink shared channel (PDSCH), short physical uplink control channel (sPUCCH), short PDSCH (sPDSCH), short PUCCH (sPUCCH), short physical uplink shared channel (sPUSCH), machine type communication PDCCH (MPDCCH), narrowband PDCCH (NPDCCH), narrowband PDSCH (NPDSCH), enhanced PDCCH (E-PDCCH), PUSCH, PUCCH, narrowband PUSCH (NPUSCH), etc.

The term TTI used herein may correspond to any time period (TO) over which a physical channel can be encoded and optionally interleaved for transmission. The physical channel is decoded by the receiver over the same time period (TO) over which it was encoded. The TTI may also interchangeably be called short TTI (sTTI), transmission time, slot, sub-slot, mini-slot, mini-subframe, etc.

The term DMRS used herein may correspond to any type of reference signals (also known as pilot signals) which are transmitted by the wireless device 16 and used by the network node 14 for at least estimating or predicting the channel. This in turn enables the network node 14 to receive, demodulate and decode the UL signals transmitted by the wireless device 16.

Note that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Figure 3:
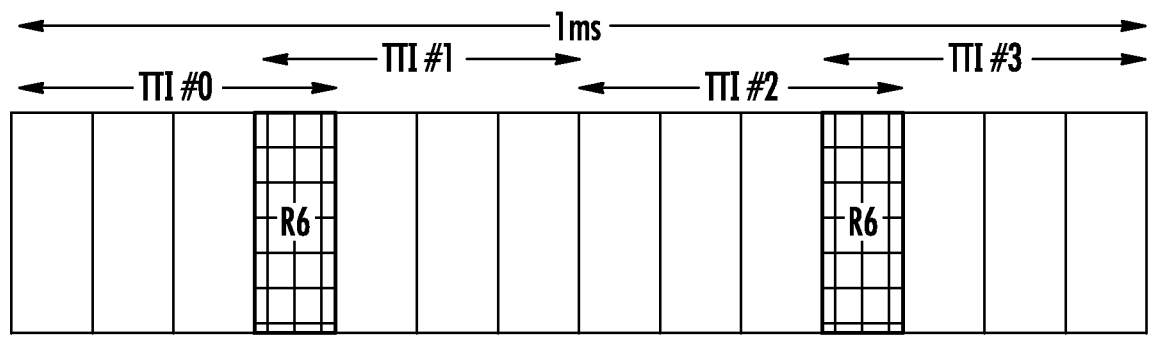
FIG. 3 is a timing diagram showing overlap DMRS.

One way to solve the above-mentioned problem of increased reference symbol overhead is to overlap demodulation reference symbols (DMRS) in time between users, as shown in FIG. 3.

The power level of the wireless device can potentially change between sTTIs when transmitting the sPUSCH. In this case, the power level of the DMRS, which is common to both sTTIs (if using a mapping similar to the one in FIG. 3) will have to be transmitted with the power level of either one of the two sTTIs. Still, the channel estimation from the DMRS applies to the data symbol(s) of both sTTIs. Hence, phase coherency may be ensured in order for the demodulation performance not to be degraded.

A power amplifier's ability to maintain the phase over amplitude variations is characterized by its AM-to-PM profile. In case large variations are expected when significantly changing the output power level, the phase reference could be considered no longer to be coherent across symbols transmitted with different power levels.

Similar to the use of different power levels between sTTIs, the bandwidth allocation can also change from one sTTI to the next. Depending on the wireless device implementation, switching between bandwidths could similarly have an impact on the phase response over the transmitted symbols, by for example re-tuning oscillator frequencies. In this case, a discontinuity in the phase reference between symbols is expected, completely collapsing the demodulation performance.

Figure 4:
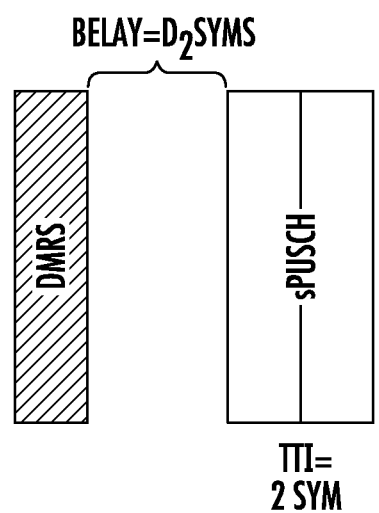
FIG. 4 is a diagram of non-contiguous DMRS.

Another aspect, not relating to sharing DMRS between TTIs, is the use of non-contiguous allocation of DMRS and data symbols in time for the same wireless device and sTTI. FIG. 4 is a diagram of non-contiguous DMRS. In this case, a DMRS is typically transmitted prior to the data symbol(s) with a fixed or variable gap between them. The wireless device would typically go into a light sleep during the idle slots, maintaining a fine clock frequency for synchronization purposes. When starting to transmit the data symbol(s), the phase coherency may no longer be kept. One means to avoid this phase discontinuity is to maintain relevant radio frequency (RF) components active during the idle symbol(s). However, this operation will consume more energy and might not be a mode of operation that current chipsets are designed for.

To solve the abovementioned problem, several different embodiments are discussed below. The methods can be implemented in a wireless device, network node or in both. Some of the methods can be implemented in a network node. Some of the methods may be pre-defined and/or use additional signaling and therefore may prompt changes in the standard.

As used herein, the term data channel refers to a transmission occupying a short transmission time interval (sTTI). Thus, in some embodiments, the wireless device transmits on successive sTTIs, any successive two of which may share a common DMRS, as shown in FIG. 3.

In a first embodiment the scheduling and resource allocation of UL data channels sharing the same DMRS are restricted to use the same allocated bandwidth, as commanded in a control message sent from the network node.

In a second embodiment the scheduling and resource allocation of two or more UL data channels sharing the same DMRS is restricted to use the same commanded power level, as commanded in a control message sent from the network node.

In a third embodiment the wireless device is mandated to use the same output power on two or more channels sharing the same DMRS, with the output power level being determined by the power level command of the first data channel, or the highest power level command of the set of data channels sharing the same DMRS.

In a fourth embodiment the network is restricted to not schedule the same wireless device on data channels sharing the same DMRS.

In a fifth embodiment the UL data channels sharing the same DMRS position can have different bandwidths and the DMRS is sent over a larger bandwidth encompassing the bandwidths of all the UL data channels sharing the same DMRS. The bandwidth of the UL data channels is determined in a careful way by the network node (e.g., eNB) so that the same power per allocated resource block is ensured.

Figure 5:
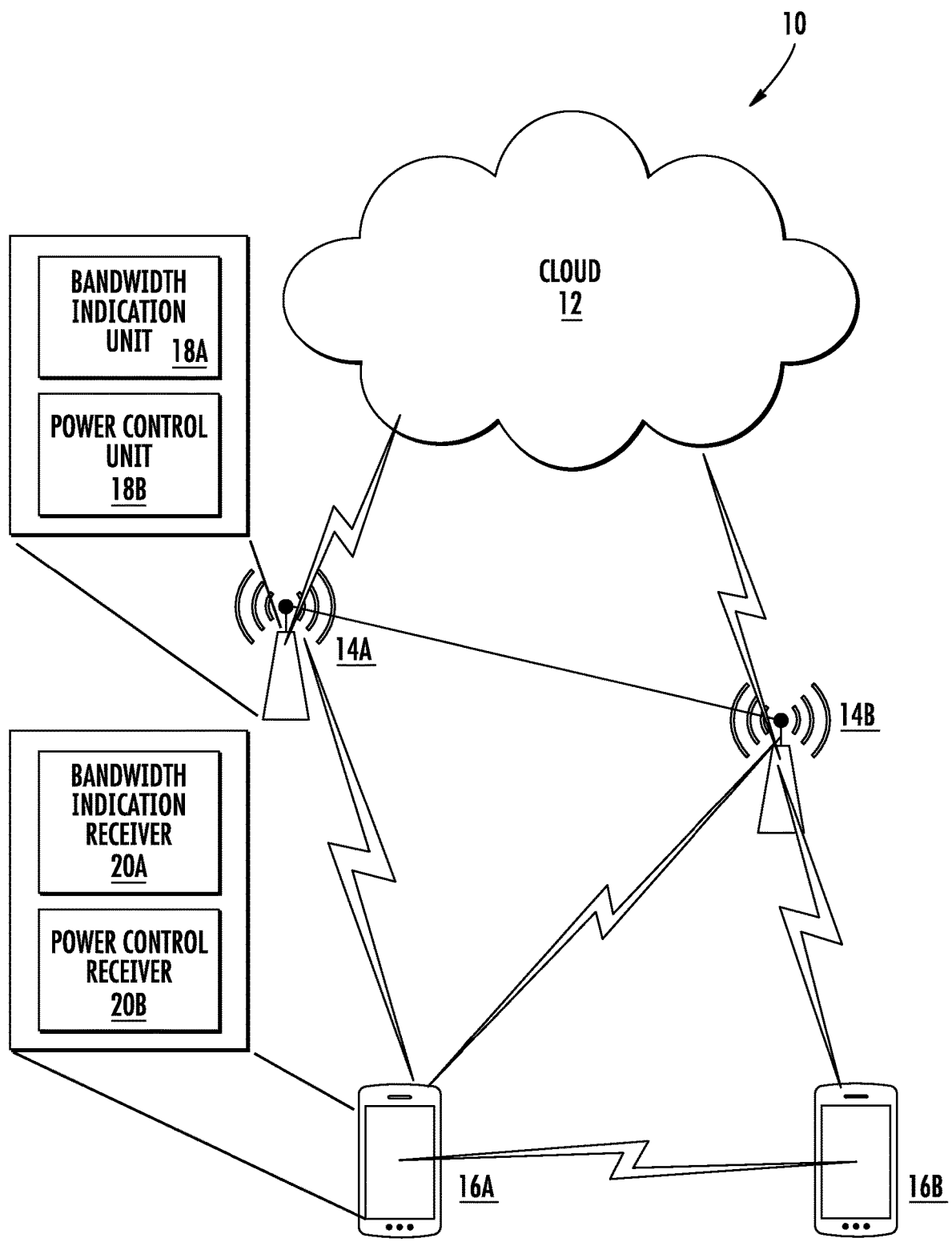
FIG. 5 is block diagram of a wireless communication system constructed in accordance with principles discussed herein.

Returning to the drawing figures, in which like elements are referred to by like reference numerals, there is shown in FIG. 5 a block diagram of a wireless communication system 10 constructed according to principles set forth herein. The wireless communication network 10 includes a cloud 12 which may include the Internet and/or the public switched telephone network (PSTN). Cloud 12 may also serve as a backhaul network of the wireless communication network 10. The wireless communication network 10 includes one or more network nodes 14A and 14B, which may communicate directly via an X2 interface in LTE embodiments, and are referred to collectively as network nodes 14. It is contemplated that other interface types can be used for communication between network nodes 14 for other communication protocols such as New Radio (NR). The network nodes 14 may serve wireless devices 16A and 16B, referred to collectively herein as wireless devices 16. Note that, although only two wireless devices 16 and two network nodes 14 are shown for convenience, the wireless communication network 10 may typically include many more wireless devices (WDs) 16 and network nodes 14. Further, in some embodiments, WDs 16 may communicate directly using what is sometimes referred to as a side link connection.

As shown in FIG. 5, the network node 14 includes a bandwidth indication unit 18A and a power control unit 18B. The bandwidth indication unit 18A is configured to determine a common bandwidth to be used by the wireless device 16 for transmission of two data channels in two successive short transmission time intervals (sTTI) that share a common demodulation reference signal (DMRS). The power control unit 18B is configured to determine a common power control command to control an output power to be set by the wireless device 16 for two data channels in two successive sTTIs that share a common DMRS. The wireless device 16 includes a bandwidth indication receiver 20A and a power control receiver 20B. The bandwidth indication receiver 20A is configured to receive a bandwidth indication from the network node 14. The power control receiver 20B is configured to receive a power control command from the network node 14.

Figure 6:
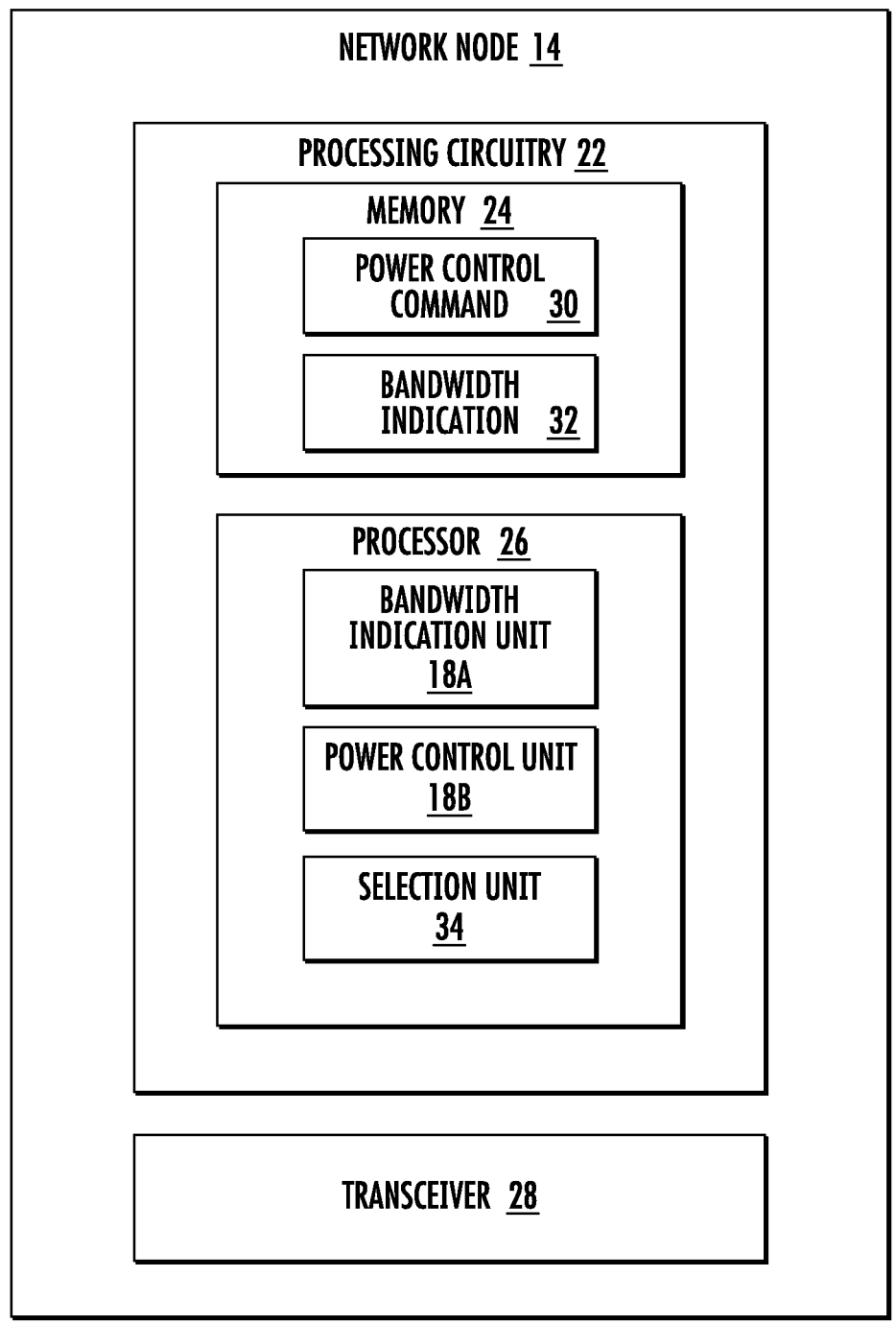
FIG. 6 is a block diagram of a network node for scheduling and resource allocation to a wireless device.

FIG. 6 is a block diagram of a network node 14 for scheduling and resource allocation to a wireless device 16. The network node 14 includes processing circuitry 22. In some embodiments, the processing circuitry may include a memory 24 and processor 26, the memory 24 containing instructions which, when executed by the processor 26, configure processor 26 to perform the one or more functions described herein. In addition to a traditional processor and memory, processing circuitry 22 may comprise integrated circuitry for processing and/or control, e.g., one or more processors and/or processor cores and/or FPGAs (Field Programmable Gate Array) and/or ASICs (Application Specific Integrated Circuitry).

Processing circuitry 22 may comprise and/or be connected to and/or be configured for accessing (e.g., writing to and/or reading from) memory 24, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 24 may be configured to store code executable by control circuitry and/or other data, e.g., data pertaining to communication, e.g., configuration and/or address data of nodes, etc. Processing circuitry 22 may be configured to control any of the methods described herein and/or to cause such methods to be performed, e.g., by processor 26. Corresponding instructions may be stored in the memory 24, which may be readable and/or readably connected to the processing circuitry 22. In other words, processing circuitry 22 may include a controller, which may comprise a microprocessor and/or microcontroller and/or FPGA (Field-Programmable Gate Array) device and/or ASIC (Application Specific Integrated Circuit) device. It may be considered that processing circuitry 22 includes or may be connected or connectable to memory, which may be configured to be accessible for reading and/or writing by the controller and/or processing circuitry 22.

In some embodiments, the memory 24 is configured to store a power control command 30 that serves to control an output power to be set by the wireless device 16 for two data channels in two successive sTTIs that share a common DMRS. The memory 24 is also configured to store a bandwidth indication 32 that service to enable the wireless device 16 to set the bandwidth of two data channels to a common bandwidth value. The processor 26 is configured to implement a bandwidth indication unit 18A configured to determine a common bandwidth to be used by the wireless device 16 for transmission of two data channels in two successive sTTIs that share a common DMRS. The processor 26 also implements a power control unit 18B configured to determine a common power control command to control an output power to be set by the wireless device 16 for two data channels in two successive sTTIs that share a common DMRS. The processor 26 also includes a selection unit 34 configured to select at least one of a common bandwidth scheme and a common power scheme. The transceiver 28 is configured to send an indication 32 of the common bandwidth to the wireless device 16 to enable the wireless device 16 to set the bandwidth of the two data channels to a common bandwidth value and is further configured to send the common power control command 30 to the wireless device 16 to enable the wireless device 16 to set the output power of the two data channels to a common power value. Although the term "transceiver" is used herein, it is understood that implementations are not limited to a device that includes an integrated transmitter and receiver. It is contemplated that separate physical transmitters and receivers can be used. Thus, the term "transceiver" is used for the sake of expediency.

Figure 7:
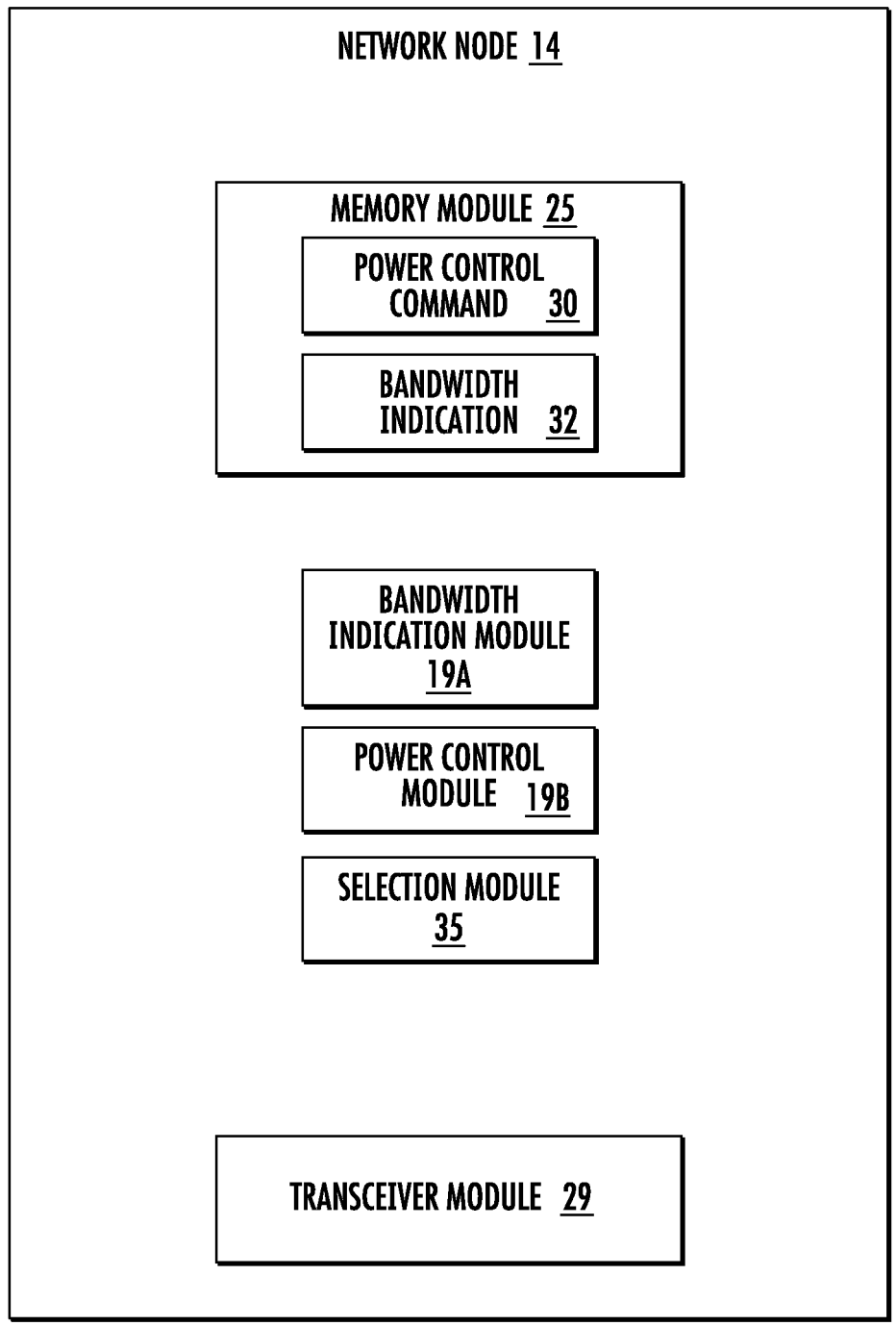
FIG. 7 is a block diagram of an alternative embodiment of the network node.

FIG. 7 is a block diagram of an alternative embodiment of the network node 14 that includes a memory module 25 configured to store the power control command 30 and the bandwidth indication 32. Software modules may be executed by a processor to perform the functions of the network node 14 described herein. For example, a bandwidth indication module 19A has software that is configured to determine a common bandwidth to be used by the wireless device 16 for transmission of two data channels in two successive sTTIs that share a common DMRS. The power control module 19B has software that is configured to determine a common power control command to control an output power to be set by the wireless device 16 for two data channels in two successive sTTIs that share a common DMRS. The selection module 35 has software that is configured to select at least one of a common bandwidth scheme and a common power scheme. The transceiver module may be implemented in part in software to perform functions of transmitting the power control command 30 and bandwidth indication 32 to the wireless device 16.

Figure 8:
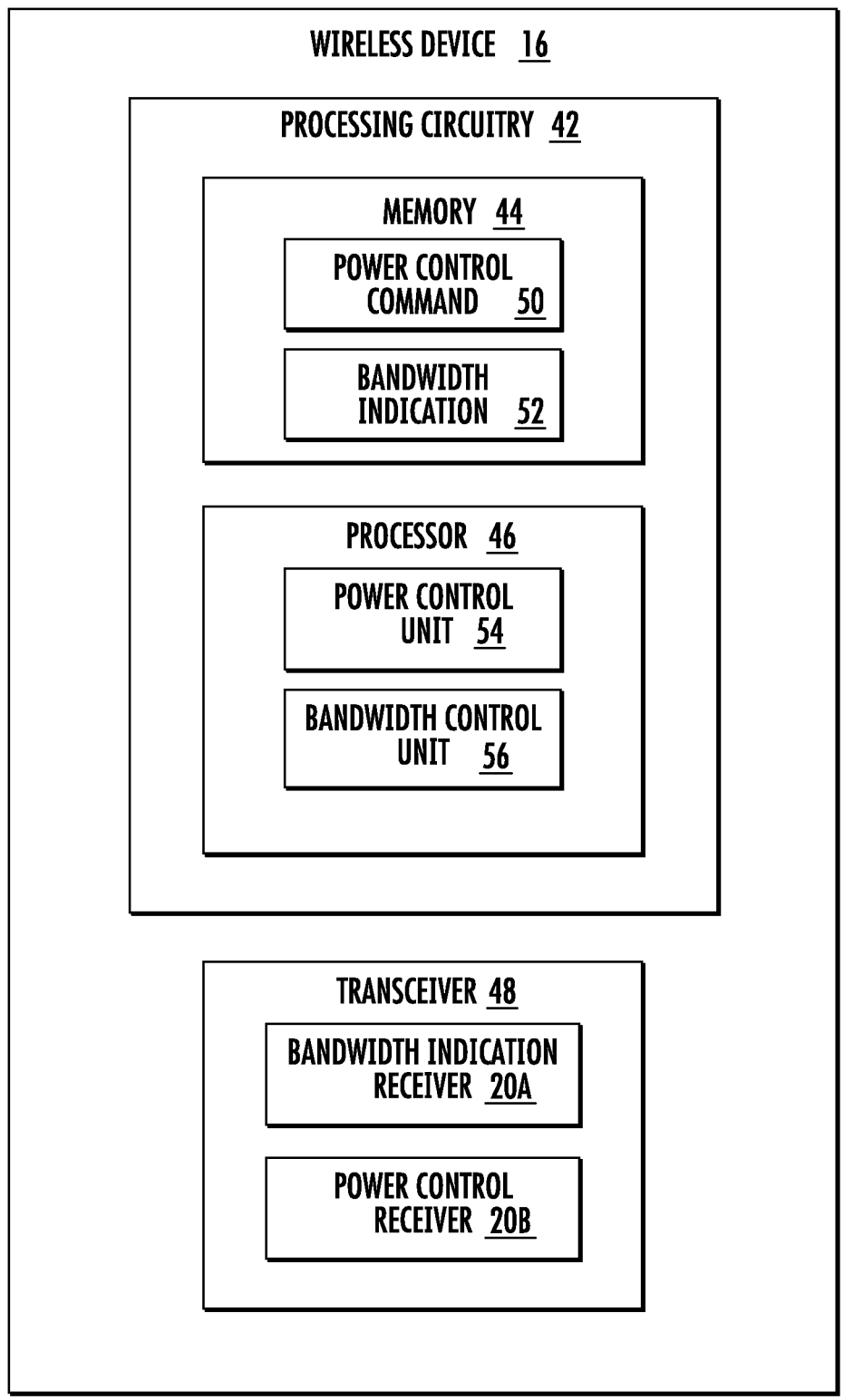
FIG. 8 is a block diagram of a wireless device for regulating uplink power.

FIG. 8 is a block diagram of a wireless device 16 for regulating uplink power. The wireless device 16 includes has processing circuitry 42. In some embodiments, the processing circuitry may include a memory 44 and processor 46, the memory 44 containing instructions which, when executed by the processor 46, configure processor 46 to perform the one or more functions described herein. In addition to a traditional processor and memory, processing circuitry 42 may comprise integrated circuitry for processing and/or control, e.g., one or more processors and/or processor cores and/or FPGAs (Field Programmable Gate Array) and/or ASICs (Application Specific Integrated Circuitry).

Processing circuitry 42 may comprise and/or be connected to and/or be configured for accessing (e.g., writing to and/or reading from) memory 44, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 44 may be configured to store code executable by control circuitry and/or other data, e.g., data pertaining to communication, e.g., configuration and/or address data of nodes, etc. Processing circuitry 42 may be configured to control any of the methods described herein and/or to cause such methods to be performed, e.g., by processor 46. Corresponding instructions may be stored in the memory 44, which may be readable and/or readably connected to the processing circuitry 42. In other words, processing circuitry 42 may include a controller, which may comprise a microprocessor and/or microcontroller and/or FPGA (Field-Programmable Gate Array) device and/or ASIC (Application Specific Integrated Circuit) device. It may be considered that processing circuitry 42 includes or may be connected or connectable to memory, which may be configured to be accessible for reading and/or writing by the controller and/or processing circuitry 42.

The memory 44 is configured to store the power control command 50 and bandwidth indication 52 received from the network node 14. The processor 46 implements a power control unit 54 and a bandwidth control unit 56. The power control unit 54 is configured to control an output power based on the common power control command to be set by the wireless device 16 for two data channels on two successive sTTIs that share a common DMRS. The bandwidth control unit 56 is configured to determine a common bandwidth based on the bandwidth indication to be used by the wireless device 16 for transmission of two data channels on two successive sTTIs that share a common demodulation reference signal, DMRS. The transceiver 48 implements the bandwidth indication receiver 20A and the power control receiver 20B.

Figure 9:
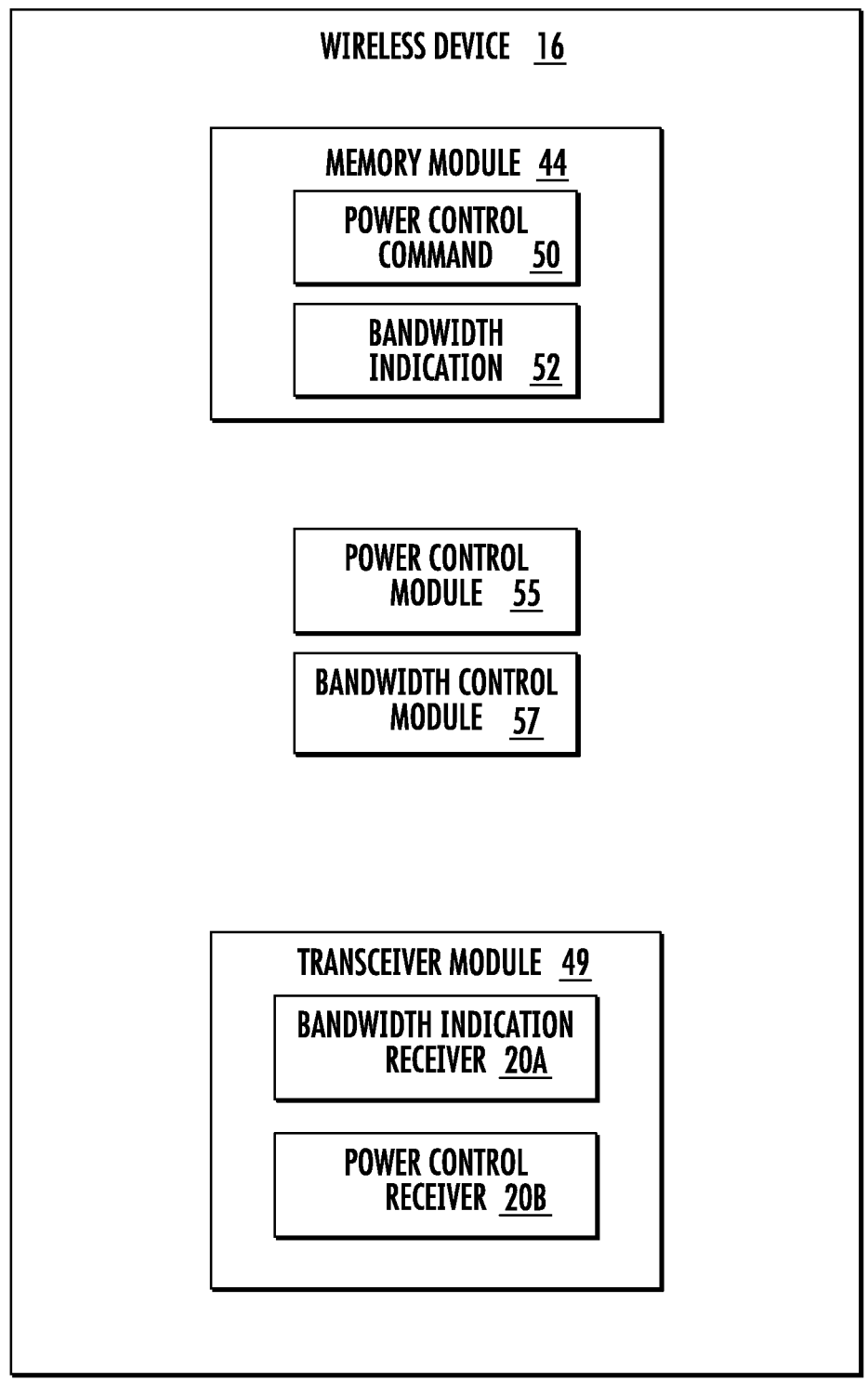
FIG. 9 is a block diagram of an alternative embodiment of the wireless device.

FIG. 9 is a block diagram of an alternative embodiment of the wireless device 16 that includes a memory module 45 configured to store the power control command 50 and the bandwidth indication 52. Software modules may be executed by a processor to perform the functions of the wireless device 16 described herein. For example, a power control module 55 has software that is configured to control an output power based on the common power control command to be set by the wireless device 16 for two data channels on two successive sTTIs that share a common DMRS. A bandwidth control module 57 has software that is configured to determine a common bandwidth based on the bandwidth indication to be used by the wireless device 16 for transmission of two data channels on two successive sTTIs that share a common DMRS.

Figure 10:
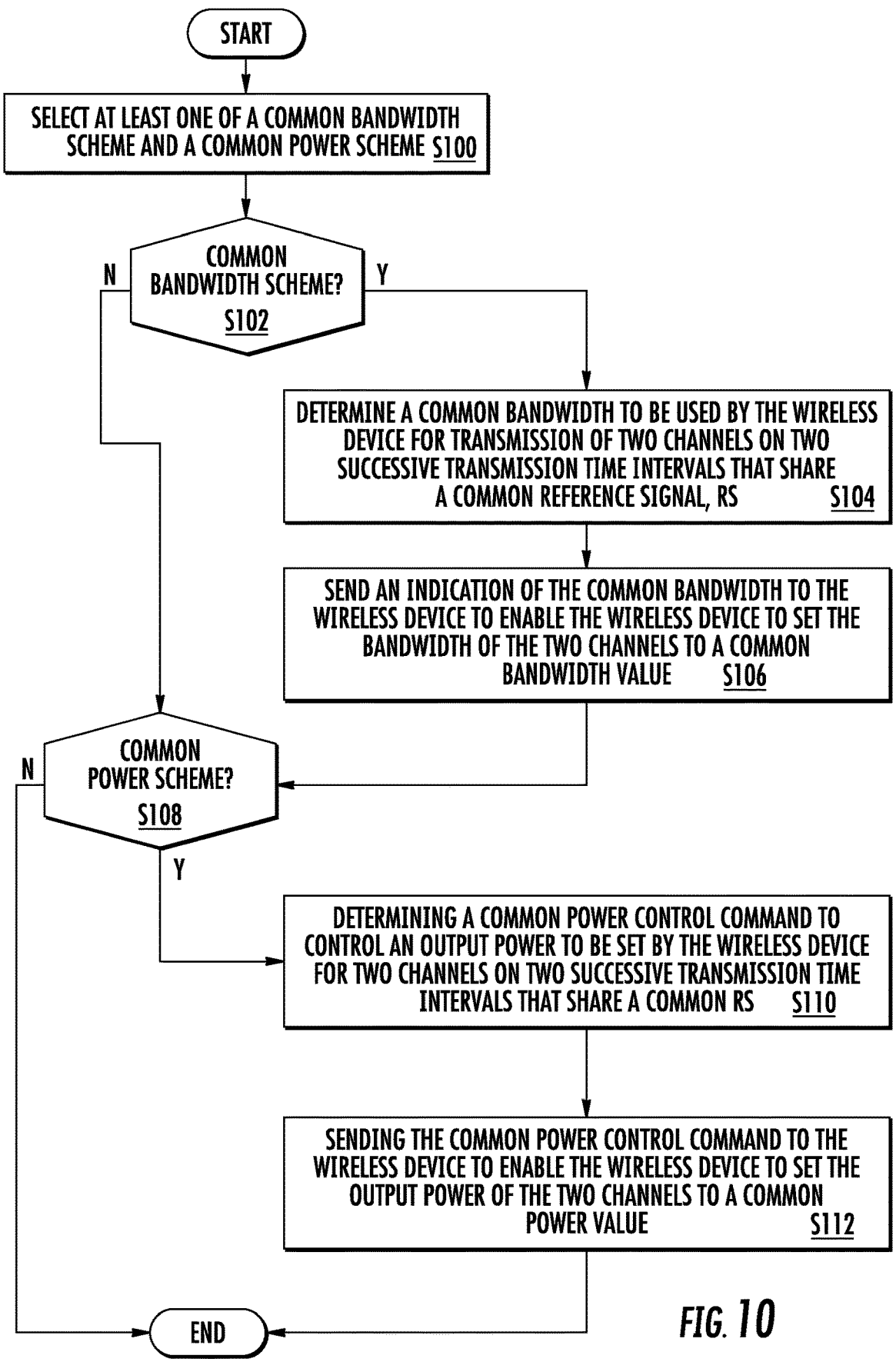
FIG. 10 is a flowchart of an exemplary process in a network node for scheduling and resource allocation to a wireless device.

FIG. 10 is a flowchart of an exemplary process in a network node 14 for resource allocation for transmissions of a wireless device 16. The process includes selecting, via the selecting unit 34, at least one of a common bandwidth scheme and a common power scheme (block S100). If a common bandwidth scheme is selected (block S102), then the process includes determining, via the bandwidth indication unit 18A, a common bandwidth to be used by the wireless device 16 for transmission of two data channels in two successive sTTI that share a common DMRS (block S104). Then the process includes sending, via the transceiver 28, an indication of the common bandwidth to the wireless device 16 to enable the wireless device 16 to set the bandwidth of the two data channels to a common bandwidth value (block S106). If a common power scheme is selected (block S108), then the process includes determining, via the power control unit 18B, a common power control command to control an output power to be set by the wireless device 16 for two data channels in two successive sTTI, that share a common DMRS (block S110). Then, the process includes sending, via the transceiver 28, the common power control command to the wireless device 16 to enable the wireless device 16 to set the output power of the two data channels to a common power value (block S112).

Figure 11:
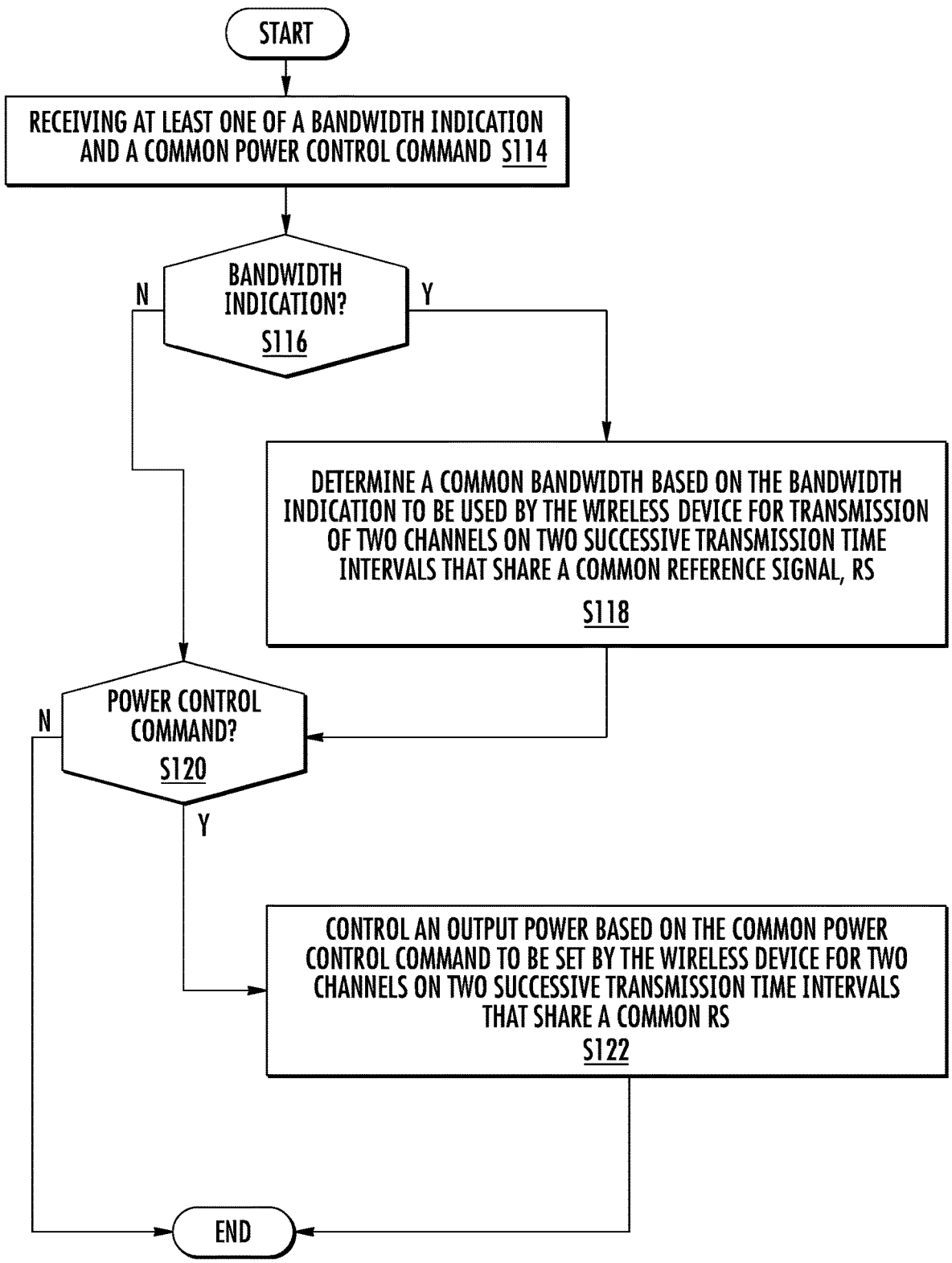
FIG. 11 is a flowchart of an exemplary process in a network node for scheduling and resource allocation to a wireless device.

FIG. 11 is a flowchart of an exemplary process in a wireless device 16 for resource allocation for uplink transmissions. The process includes receiving at least one of a bandwidth indication and a common power control command (block S114). If the bandwidth indication is received (block S116), then the process includes determining, via the bandwidth control unit 56, a common bandwidth based on the bandwidth indication to be used by the wireless device 16 for transmission of two data channels in two successive sTTIs that share a common DMRS (block S118). If a power control command is received (S120), then the process includes controlling, via the power control unit 54, an output power based on the common power control command to be set by the wireless device 16 for two data channels in two successive sTTIs that share a common DMRS (block S122).

Figure 12:
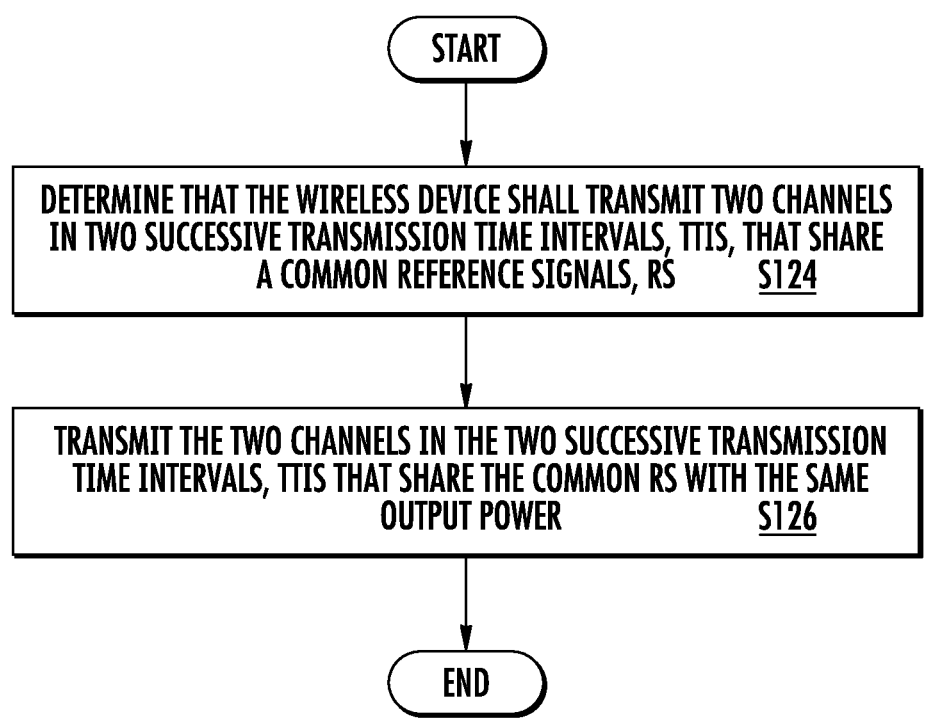
FIG. 12 is a flowchart of an exemplary process in a wireless device of regulating uplink power.

FIG. 12 is a flowchart of an exemplary process in a wireless device 16 of regulating uplink power for uplink transmissions of signals. A determination is made that the wireless device 16 shall transmit two channels in two successive TTIs that share a common RS (block S124). In one embodiment, this determination is made by wireless device processing circuitry 42. The two channels in the two successive TTIs that share the common RS with the same output power are transmitted (block S126). In one embodiment, the transmission is made by transceiver 48.

Some embodiments provide at least the following advantages:
 Avoiding impact to RF implementation, allowing existing chipset platforms to be upgraded to support the reduced latency feature; and
 Minimizing research and development efforts in the RF domain which typically are challenging in the development of new products.

In a first embodiment, the scheduling and resource allocation of data channels sharing the same DMRS is restricted to use the same allocated bandwidth. This method can be implemented in the network node 14 scheduling the wireless device 16. For example, the network node 14 may allocate the same BWs to the first sTTI (sTTI1) and the second sTTI (sTTI2) sharing the same DMRS. In one example sTTI1 and sTTI2 can be assigned to the same wireless device 16 or to different wireless devices 16. For example, in sTTI1 and sTTI2 the same part of the bandwidth BW (e.g., RBs are used.

The network node 14 may adapt its scheduling such that a similar size of data channels is transmitted in successive sTTIs sharing the same BW in order to ensure efficient use of the allocated BWs in the successive sTTIs.

The power level of the wireless device 16 can potentially change between sTTIs when transmitting the sPUSCH. In this case, the power level of the DMRS, which is common to both sTTIs (if using a mapping similar to the one in FIG. 3) may be transmitted with the power level of either one of the two sTTIs. Still, the channel estimation from the DMRS applies to the data symbol(s) of both sTTIs. Hence phase coherency is preferably ensured in order for the demodulation performance not to be degraded.

A power amplifier's ability to maintain the phase over amplitude variations is characterized by its AM-to-PM profile. In case large variations are expected when significantly changing the output power level, the phase reference could be considered no longer to be coherent across symbols transmitted with different power levels.

In a second embodiment a network node 14 serving a wireless device 16 may transmit the same power control command (also known as a common power control command) to the wireless device 16 for adjusting the wireless device 16 transmit power used for transmitting two or more UL signals in two or more sTTI sharing the same DMRS. For example, the power control command may be transmitted in a reference sTTI among the group of the sTTIs sharing the same DMRS. Examples of a reference sTTI is any of the sTTI in the group of sTTI, first sTTI, last sTTI in the group, etc.

The network node 14 may determine the common power control command based on one or more of the following:
- UL received signal level (e.g., signal to noise ratio (SNR), signal to interference plus noise ratio (SINR), block error rate (BLER)) in one or more sTTIs in a group of sTTIs sharing the same DMRS. For example, the network node 14 may determine power control command which corresponds to lowest UL signal quality in two or more sTTI.
- The value of power control command which is determined based on mapping between the power control command and a change in phase of UL received signals at the network node 14.
- Determine the power control command for each sTTI and use a function of the determined power control command to select the effective or final power control command. Examples of such function are maximum, minimum, average, etc.

The network node 14 may apply this method based on a pre-defined rule, autonomous decision by the network node 14, statistics or historical data, etc.

In a third embodiment, the wireless device 16 transmits with the same output power on two or more data channels sharing the same DMRS. For example, the same wireless device 16 transmitting signals on two successive sTTI sharing the same DMRS may transmit with the same output power.

In one example, the output power level of the wireless device 16 in all sTTIs sharing the same DMRS is determined by the power control command associated with a reference sTTI. The power control command is transmitted to the wireless device 16 by the network node 14. In one example, the reference power control command is associated with the first sTTI among a group of two or more sTTIs sharing the same DMRS. In another example, the reference power control command is associated with the last sTTI among a group of two or more sTTIs sharing the same DMRS. In yet another example, the reference power control command is determined based on a function of power control commands associated with two or more sTTIs sharing the same DMRS. Examples of functions are maximum, minimum, average, etc. For example, the wireless device 16 may receive all power control commands for all sTTIs sharing the same DMRS, may select the maximum of the power control command out of the received commands and apply the selected power control command for adjusting the transmit power over all sTTIs sharing the same DMRS.

The wireless device 16 may apply any of the above rules based on pre-defined information, an indication received from the network node 14, historical data, or based on the wireless device 16 autonomous decision.

In a fourth embodiment, the network node 14 adapts its scheduling by not scheduling the same wireless device 16 on data channels sharing the same DMRS, i.e., the same wireless device 16 is not scheduled for UL transmission of signals on successive sTTI. Instead the network node 14 may schedule the same wireless device 16 over non-successive sTTIs. This is also referred to herein as orthogonal scheduling in sTTIs.

In one example, the network node 14 may apply the orthogonal scheduling described above regardless of any condition or criteria. In another example, the network node 14 may apply the orthogonal scheduling when one or more conditions is met. Examples of conditions are:
- Reception quality (e.g., SNR, SINR, BLER, etc.) of UL signals received at the network node 14 (i.e., the serving base station) falls below a threshold;
- wireless device 16 transmission causes larger change in phase, e.g., causing demodulation problem of signals at the network node 14;
- wireless device 16 output power is above a threshold;
- wireless device 16 transmit power changes with a rate larger than a threshold, e.g., X dBm or more, over time period T0.

Similarly to the use of different power levels between sTTIs, the bandwidth allocation can change from one sTTI to the next. Depending on the wireless device 16 implementation, switching between bandwidths could similarly have an impact to the phase response over the transmitted symbols, by for example re-tuning oscillator frequencies. In this case, a discontinuity in the phase reference between symbols is expected, completely collapsing the demodulation performance. In a fifth embodiment, the UL data channels sharing the same DMRS position can have different bandwidths but the DMRS is sent over a larger bandwidth encompassing the bandwidths of all the UL data channels sharing the same DMRS.

For example, the network node 14 may allocate bandwidths BW1 and BW2 to the wireless device 16 for UL data transmission in sTTI1 and sTTI2, respectively. During sTTI1 and sTTI2 the DMRS is sent over common bandwidth (BW3) which contains BW1 and BW2. For example, the wireless device 16 is allocated BW1 corresponding to RBs range between 1 to 5 and BW2 corresponding to RBs ranging between 7 to 12 respectively. In this case, the network node 14 may allocate BW3 for the DMRS comprising at least RBs 1-12.

In another aspect of this embodiment, the network node 14 may determine the bandwidths of the UL data channels so that the same power per allocated resource block is ensured. In another aspect of this embodiment the network node 14 may further determine the bandwidths of the UL data channels and also allocate the UL transmit power so that the same power per allocated resource block is ensured.

The network node 14 may apply this rule of adapting the SRS BW based on pre-defined rule or based on autonomous decision in the network node 14.

In a sixth embodiment, any combination of methods described in the preceding embodiments can be applied by the network node 14 and/or by the wireless device 16. In one embodiment, the network node 14 may apply combination of any two or more methods regardless of any condition. In another aspect of this embodiment, the combination of methods is used provided one or more condition is met. Examples of conditions are:
- Data rate required by the wireless device 16, e.g., if wireless device 16 needs a higher data rate, then the network node 14 may apply methods described above with reference to methods for adapting wireless device 16 allocated bandwidth and methods for adapting power control commands, since the wireless device 16 will be transmitting at higher power.
- Number of wireless devices 16 in the cell. In case of a large number of wireless devices 16 in the cell, the network node 14 may apply the methods described above with reference to methods for adapting wireless device 16 allocated bandwidth and methods for adapting the wireless device 16 transmit power.
- Wireless device 16 output power, e.g., if wireless device 16 transmit power is below a certain threshold, then the network node 14 may apply methods described above with reference to methods for adapting power control commands and methods for adapting the DMRS bandwidth.

Wireless device capability. That is, if the wireless device 16 is capable of supporting two or more methods.

Some embodiments restrict the resource handling in the specification to allow ultra-low network latency while at the same time minimizing unnecessary overhead from shorter transmission intervals, avoiding any potential RF implementation impact in the chipset platform.

Thus, according to one aspect, a method in a network node 14 for resource allocation for transmissions of a wireless device 16 is provided. The method includes selecting at least one of a common bandwidth scheme and a common power scheme. If the selected at least one scheme includes a common bandwidth scheme, then the method includes determining a common bandwidth to be used by the wireless device 16 for transmission of two data channels in two successive short transmission time intervals (sTTIs) that share a common demodulation reference signal (DMRS); and sending an indication of the common bandwidth to the wireless device 16 to enable the wireless device 16 to set the bandwidth of the two data channels to a common bandwidth value. If the selected at least one scheme includes a common power scheme, then the method includes determining a common power control command to control an output power to be set by the wireless device 16 for two data channels in two successive sTTI, that share a common DMRS; and sending the common power control command to the wireless device 16 to enable the wireless device 16 to set the output power of the two data channels to a common power value.

According to the aspect, in some embodiments, the data channels transmitted in two successive sTTIs are physical uplink shared channels (PUSCH). In some embodiments, the common bandwidth is greater than a bandwidth of one of the two data channels having a greatest bandwidth. In some embodiments, the common bandwidth encompasses a combined bandwidth of the two successive sTTIs. In some embodiments, the common bandwidth is selected to ensure a same power per allocated resource block. In some embodiments, the indication of the common bandwidth includes a bandwidth of the DMRS that encompasses the bandwidth of the two successive sTTIs. In some embodiments, the common power control command instructs the wireless device 16 to set the output power of the two data channels to a highest power of a plurality of power levels. In some embodiments, the common power control command is based on at least one of a signal level of a received uplink signal and a mapping between the common power control command to a change in phase of a received uplink signal. In some embodiments, the common power control command is based on a function of a power level available at the wireless device 16, the function being one of a maximum, a minimum and an average. In some embodiments, the common power control command is autonomously determined by the network node 14 based on one of a pre-defined rule, statistics and historical data. In some embodiments, the common power value is a wireless device-selected power of a selected one of the two successive sTTIs. In some embodiments, the common power control command establishes a maximum power and instructs the wireless device 16 not to exceed the maximum power when establishing the common power value. In some embodiments, the network node 14 schedules non-successive data channels for a wireless device 16.

According to another aspect, a network node 14 for resource allocation for transmissions of a wireless device 16 is provided. The network node 14 includes processing circuitry 22 configured to select at least one of a common bandwidth scheme and a common power scheme. If the selected at least one scheme includes a common bandwidth scheme, then: the processing circuitry 22 is configured to determine a common bandwidth to be used by the wireless device 16 for transmission of two data channels in two successive sTTIs that share a common DMRS; and further to send an indication of the common bandwidth to the wireless device 16 to enable the wireless device 16 to set the bandwidth of the two data channels to a common bandwidth value. If the selected at least one scheme includes a common power scheme, then the processing circuitry 22 is configured to determine a common power control command to control an output power to be set by the wireless device 16 for two data channels in two successive sTTIs that share a common DMRS; and send the common power control command to the wireless device 16 to enable the wireless device 16 to set the output power of the two data channels to a common power value.

According to this aspect, in some embodiments, the two data channels transmitted in two successive sTTIs are PUSCH. In some embodiments, the common bandwidth is greater than a bandwidth of one of the two data channels having a greatest bandwidth. In some embodiments, the common bandwidth encompasses a combined bandwidth of the two successive sTTIs. In some embodiments, the common bandwidth is selected to ensure a same power per allocated resource block. In some embodiments, the indication of the common bandwidth includes a bandwidth of the DMRS that encompasses the bandwidth of the two successive sTTIs. In some embodiments, the common power control command instructs the wireless device 16 to set the output power of the two data channels to a highest power of a plurality of power levels. In some embodiments, the common power control command is based on at least one of a signal level of a received uplink signal and a mapping between the common power control command to a change in phase of a received uplink signal. In some embodiments, the common power control command is based on a function of a power level available at the wireless device 16, the function being one of a maximum, a minimum and an average. In some embodiments, the common power control command is autonomously determined by the network node 14 based on one of a pre-defined rule, statistics and historical data. In some embodiments, the common power value is a wireless device-selected power of a selected one of the two successive sTTIs. In some embodiments, the common power control command establishes a maximum power and instructs the wireless device 16 not to exceed the maximum power when establishing the common power value. In some embodiments, the network node 14 schedules non-successive data channels for a wireless device 16.

According to yet another aspect, a network node 14 for resource allocation for transmissions of a wireless device 16. The network node 14 includes a selection module 35 configured to select at least one of a common bandwidth scheme and a common power scheme. The network node 14 includes a bandwidth indication module 19A configured to determine a common bandwidth to be used by the wireless device 16 for transmission of two data channels in two successive sTTIs that share a common DMRS. The network node 14 further includes a transceiver module 29 configured to send an indication of the common bandwidth to the wireless device 16 to enable the wireless device 16 to set the bandwidth of the two data channels to a common bandwidth value. The network node 14 includes a power control module 19B configured to determine a common power control command to control an output power to be set by the wireless device 16 for two data channels in two successive sTTIs that share a common DMRS. The transceiver module 29 is further configured to send the common power control command to the wireless device 16 to enable the wireless device 16 to set the output power of the two data channels to a common power value.

According to yet another aspect, a method in a wireless device 16 for resource allocation for uplink transmissions is provided. The method includes receiving at least one of a bandwidth indication and a common power control command. If a bandwidth indication is received, then the method includes determining a common bandwidth based on the bandwidth indication to be used by the wireless device 16 for transmission of two data channels in two successive sTTIs that share a common DMRS. If a common power control command is received, then the method includes controlling an output power based on the common power control command to be set by the wireless device 16 for two data channels in two successive sTTIs that share a common DMRS.

According to this aspect, in some embodiments, the two data channels are PUSCH. In some embodiments, the common bandwidth is greater than a bandwidth of one of the two data channels having a greatest bandwidth. In some embodiments, the common bandwidth encompasses a combined bandwidth of the two successive sTTIs. In some embodiments, the common bandwidth is selected to ensure a same power per allocated resource block. In some embodiments, the bandwidth indication indicates a bandwidth of the DMRS that encompasses the bandwidth of the two successive sTTIs. In some embodiments, the common power control command instructs the wireless device 16 to set the output power of the two data channels to a highest power of a plurality of power levels. In some embodiments, the common power control command establishes a maximum power and instructs the wireless device 16 not to exceed the maximum power when establishing the common power value.

According to another aspect, a wireless device 16 for resource allocation for uplink transmissions is provided. The wireless device 16 includes a transceiver configured to receive at least one of a bandwidth indication and a common power control command. The wireless device 16 further includes processing circuitry 42 configured to determine a common bandwidth based on the bandwidth indication to be used by the wireless device 16 for transmission of two data channels on two successive sTTI that share a common DMRS. The processing circuitry 42 is further configured to control an output power based on the common power control command to be set by the wireless device 16 for at least two data channels on two successive sTTIs that share a common DMRS.

According to this aspect, in some embodiments, two data channels are physical uplink shared channels, PUSCH. In some embodiments, the common bandwidth is greater than a bandwidth of one of the two data channels having a greatest bandwidth. In some embodiments, the common bandwidth encompasses a combined bandwidth of the two successive sTTIs. In some embodiments, the common bandwidth is selected to ensure a same power per allocated resource block. In some embodiments, the bandwidth indication indicates a bandwidth of the DMRS that encompasses the bandwidth of the two successive sTTIs. In some embodiments, the common power control command instructs the wireless device 16 to set the output power of the two data channels to a highest power of a plurality of power levels. In some embodiments, the common power control command establishes a maximum power and instructs the wireless device 16 not to exceed the maximum power when establishing the common power value.

According to yet another aspect, a wireless device 16 for resource allocation for uplink transmissions is provided. The wireless device 16 includes a transceiver module 49 configured to receive at least one of a bandwidth indication and a common power control command. The wireless device also includes a bandwidth control module 57 configured to determine a common bandwidth based on the bandwidth indication to be used by the wireless device 16 for transmission of two data channels on two successive sTTIs that share a common DMRS. The wireless device 16 also includes a power control module 55 configured to control an output power based on the common power control command to be set by the wireless device 16 for two data channels on two successive sTTIs that share a common DMRS.

According to another aspect, a method in a wireless device 16 for uplink transmissions of signals is provided. The method includes determining that the wireless device 16 shall transmit two channels in two successive transmission time intervals, TTIs, that share a common reference signal, RS (S124). The method also includes transmitting the two channels in the two successive transmission time intervals, TTIs that share the common RS with the same output power (S126).

According to this aspect, in some embodiments, the TTI is any of: a short TTI, sTTI, slot, and a mini-slot. In some embodiments, the RS is any of a demodulation reference signal (DMRS) and a sounding reference signal, SRS.

According to yet another aspect, a wireless device 16 for uplink transmissions of signals is provided. The wireless device includes processing circuitry 42 configured to determine that the wireless device 16 shall transmit two channels in two successive transmission time intervals (TTIs), that share a common reference signal (RS) and a transceiver 48 configured to transmit the two channels in the two successive transmission time intervals, TTIs that share the common RS with the same output power.

According to this aspect, in some embodiments, the TTI is any of: a short TTI, sTTI, slot, and a mini-slot. In some embodiments, the RS is any of a demodulation reference signal, DMRS, and a sounding reference signal (SRS).

Some embodiments include:

Embodiment 1

A method in a network node for scheduling and resource allocation to a wireless device, the method comprising:
allocating a first bandwidth to a first short transmission time interval, sTTI; and allocating the first bandwidth to a second sTTI sharing a same demodulation reference symbol, DMRS as the first sTTI.

Embodiment 2

The method of Embodiment 1, wherein the first sTTI and the second sTTI are assigned to a same wireless device.

Embodiment 3

A method in a network node for scheduling and resource allocation to a wireless device, the method comprising:
determining a common power control command, the common power control command used to adjust the wireless device transmit power for transmitting uplink signals in at least two short transmission time intervals, sTTI, sharing a same demodulation reference symbol, DMRS; and transmitting the common power control command to the wireless device.

Embodiment 4

The method of Embodiment 3, wherein the common power control command is transmitted in a reference sTTI among a group of sTTIs sharing a same DMRS.

Embodiment 5

The method of Embodiment 3, wherein the common power control command is based on at least one of an uplink signal quality and uplink signal phase change.

Embodiment 6

A method in a wireless device of regulating uplink power, the method comprising:
generating a demodulation reference symbol, DMRS; and transmitting a same output power on at least two data channels sharing the DMRS.

Embodiment 7

The method of Embodiment 6, wherein the wireless device transmits signals on two successive short transmission time intervals, sTTIs, sharing the same DMRS, the transmitted signals being transmitted with a same output power.

Embodiment 8

The method of Embodiment 6, wherein the wireless device selects a maximum of power control commands received during all sTTIs sharing the same DMRS to control the uplink power.

Embodiment 9

A method in a network node for scheduling and resource allocation to a wireless device, the method comprising:
determining non-successive short transmission time intervals, sTTIs;
scheduling the wireless device to transmit over the non-successive sTTIs.

Embodiment 10

The method of Embodiment 9, wherein the scheduling is conditioned upon at least one of reception quality of uplink signals received at the network node, demodulation success at the network node, and transmission by the wireless device of power changes at a rate that exceeds a threshold.

Embodiment 11

A method in a network node for scheduling and resource allocation to a wireless device, the method comprising:
assigning different bandwidths to uplink channels sharing a same demodulation reference symbol, DMRS, position; and allocating a bandwidth to the DMRS that encompasses the bandwidth of the uplink channels sharing the DMRS.

Embodiment 12

A network node for scheduling and resource allocation to a wireless device, the network node comprising:
processing circuitry including a memory and a processor:
the memory configured to store bandwidth allocations for short transmission time intervals, sTTIs; and
the processor configured to allocate bandwidths to sTTIs sharing a same demodulation reference symbol, DMRS.

Embodiment 13

A network node for scheduling and resource allocation to a wireless device, the network node comprising:
a memory module configured to store bandwidth allocations for short transmission time intervals, sTTIs;
a bandwidth allocation module configured to allocate bandwidths to sTTIs sharing a same demodulation reference symbol, DMRS.

Embodiment 14

A network node for scheduling and resource allocation to a wireless device, the network node comprising:
processing circuitry including a memory and a processor:
the memory configured to store a common power control command; and
the processor configured to:
generate a power control command used to adjust the wireless device transmit power for transmitting uplink signals in at least two short transmission time intervals, sTTI, sharing a same demodulation reference symbol, DMRS; and
a transceiver configured to transmit the common power control command to the wireless device.

Embodiment 15

A wireless device for regulating uplink power, the wireless device comprising:
processing circuitry including a memory and a processor:
the memory configured to store a power control command and demodulation reference symbols, DMRS; and
the processor configured to cause transmission of a same output power on at least two channels sharing the DMRS, the output power being determined by the power control command; and
a transceiver configured to transmit the same output power on at least the two channels sharing the DMRS.

Embodiment 16

A wireless device for regulating uplink power, the wireless device comprising:
a memory module configured to store a power control command and a demodulation reference symbol, DMRS;
a transmit controller module configure to cause transmission of a same output power on at least two channels sharing the DMRS, the output power being determined by the power control command; and
a transceiver module configured to transmit the same output power on the at least two channels sharing the DMRS. Included as an Appendix is additional written description.

| Abbreviation | Explanation |
|---|---|
| BLER | Block Error Rate |
| CFI | Control Format Indicator |
| CRS | Common Reference Symbols |
| DL | Downlink |
| DFT | Discrete Fourier Transform |
| DMRS | Demodulation Reference Symbols |
| FDD | Frequency Division Duplex |
| FDMA | Frequency Division Multiple Access |
| FS | Frame Structure |
| HARQ | Hybrid Automatic Repeat Request |
| HTTP | Hypertext Transfer Protocol |
| OFDM | Orthogonal Frequency Division Multiplexing |
| PUCCH | Physical Uplink Control Channel |
| PUSCH | Physical Uplink Shared Channel |
| RF | Radio Frequency |
| SC | Single Carrier |
| SF | Subframe |
| sPUCCH | Short PUCCH |
| sPUSCH | Short PUSCH |
| sTTI | Short TTI |
| TCP | Transmission Control Protocol |
| TDD | Time Division Duplex |
| TTI | Transmission Time Interval |
| Wireless Device | User Equipment |
| UL | Uplink |

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to therefore create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method in a network node for resource allocation for transmissions of a wireless device, the method comprising:
   determining a common bandwidth to be used by the wireless device for transmission of two channels in two successive transmission time intervals, TTIs, that share a common reference signal, RS;
   sending an indication of the common bandwidth to the wireless device to enable the wireless device to set a bandwidth of the two channels to a common bandwidth value;
   determining a common power control command to control an output power to be set by the wireless device for the two channels in the two successive TTIs that share the common RS; and sending the common power control command to the wireless device to enable the wireless device to set the output power of the two channels to a common power value.

2. The method of claim 1, wherein the two channels transmitted in the two successive TTIs are physical uplink shared channels, PUSCH.

3. The method of claim 1, wherein the common bandwidth is greater than a bandwidth of one of the two channels having a greatest bandwidth.

4. The method of claim 1, wherein the common bandwidth encompasses a combined bandwidth of the two successive short TTIs.

5. The method of claim 1, wherein the common bandwidth is selected to ensure a same power per allocated resource block.

6. The method of claim 1, wherein the indication of the common bandwidth includes a bandwidth of the RS that encompasses the bandwidth of the two successive TTIs.

7. The method of claim 1, wherein the common power control command instructs the wireless device to set the output power of the two channels to a highest power of a plurality of power levels.

8. The method of claim 1, wherein the common power control command is based on at least one of a signal level of a received uplink signal and a mapping between the common power control command to a change in phase of a received uplink signal.

9. The method of claim 1, wherein the RS is any of a demodulation reference signal, DMRS, and a sounding reference signal, SRS.

10. A network node for resource allocation for transmissions of a wireless device, the network node comprising:
    processing circuitry configured to:
        determine a common bandwidth to be used by the wireless device for transmission of two channels in two successive transmission time intervals, TTIs, that share a common reference signal, RS;
        send an indication of the common bandwidth to the wireless device to enable the wireless device to set a bandwidth of the two channels to a common bandwidth value;
        determine a common power control command to control an output power to be set by the wireless device for the two channels in the two successive TTIs that share the common RS; and
        send the common power control command to the wireless device to enable the wireless device to set the output power of the two channels to a common power value.

11. The network node of claim 10, wherein the two channels transmitted in two successive sTTIs are physical uplink shared channels, PUSCH.

12. The network node of claim 10, wherein the common bandwidth is greater than a bandwidth of one of the two channels having a greatest bandwidth.

13. The network node of claim 10, wherein the common bandwidth encompasses a combined bandwidth of the two successive TTIs.

14. The network node of claim 10, wherein the common bandwidth is selected to ensure a same power per allocated resource block.

15. A method in a wireless device for uplink transmission of signals, the method comprising:
    receiving a bandwidth indication and a common power control command;
    determining a common bandwidth based on the bandwidth indication to be used by the wireless device for transmission of two channels in two successive transmission time intervals, TTIs, that share a common reference signal, RS; and
    controlling an output power based on the common power control command to be set by the wireless device for the two channels in the two successive TTIs that share the common RS.

16. The method of claim 15, wherein the two channels are physical uplink shared channels, PUSCH.

17. The method of claim 15, wherein the common bandwidth encompasses a combined bandwidth of the two successive TTIs.

18. The method of claim 15, wherein the common bandwidth is selected to ensure a same power per allocated resource block.

19. The method of claim 15, wherein a TTI is any of: a short TTI, sTTI, slot, and a mini-slot.

20. A wireless device for resource allocation for uplink transmissions, the wireless device comprising:
    a transceiver configured to receive a bandwidth indication and a common power control command; and
    processing circuitry configured to:
        determine a common bandwidth based on the bandwidth indication to be used by the wireless device for transmission of two channels on two successive transmission time intervals, TTIs, that share a common reference signal, RS; and
        control an output power based on the common power control command to be set by the wireless device for at least the two channels in the two successive TTIs that share the common RS.

21. The wireless device of claim 20, wherein the two channels are physical uplink shared channels, PUSCH.

* * * * *

UNITED STATES PATENT AND TRADEMARK OFFICE
CERTIFICATE OF CORRECTION

PATENT NO.       : 11,089,550 B2
APPLICATION NO.  : 16/344063
DATED            : August 10, 2021
INVENTOR(S)      : Sundberg et al.

Page 1 of 1

It is certified that error appears in the above-identified patent and that said Letters Patent is hereby corrected as shown below:

In the Specification

In Column 2, Line 1, delete "often" and insert -- of ten --, therefor.

In Column 7, Line 13, delete "R." and insert -- RS. --, therefor.

In Column 7, Line 44, delete "is" and insert -- is a --, therefor.

In Column 8, Line 51, delete "equipped" and insert -- equipment --, therefor.

In Column 11, Line 60, delete "service" and insert -- serves --, therefor.

In Column 22, Line 60, delete "configure" and insert -- configured --, therefor.

Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office*